(12) United States Patent
Kagawa et al.

(10) Patent No.: US 6,624,105 B2
(45) Date of Patent: Sep. 23, 2003

(54) OXIDE CERAMIC FIBER/OXIDE CERAMIC COMPOSITE MATERIAL AND PROCESS FOR PRODUCTION THEREOF

(75) Inventors: Yutaka Kagawa, Tokyo (JP);
Yoshinobu Komatsubara, Tochigi (JP);
Hiroshi Nakamura, Tokyo (JP);
Katsusuke Iwanaga, Tochigi (JP)

(73) Assignee: Mitsui Mining Material Co., Ltd., Tokyo (JP)

( * ) Notice: Subject to any disclaimer, the term of this patent is extended or adjusted under 35 U.S.C. 154(b) by 144 days.

(21) Appl. No.: 09/838,092

(22) Filed: Apr. 19, 2001

(65) Prior Publication Data

US 2002/0037802 A1 Mar. 28, 2002

(30) Foreign Application Priority Data

Sep. 28, 2000 (JP) .......................................... 2000-296346

(51) Int. Cl.$^7$ ........................... C04B 35/80; B32B 19/00
(52) U.S. Cl. ................. 501/95.2; 428/293.4; 428/293.7
(58) Field of Search ....................... 501/95.2; 428/293.4, 428/293.7

(56) References Cited

U.S. PATENT DOCUMENTS 5,488,017 A * 1/1996 Szweda et al. ............ 501/95.2
5,854,154 A * 12/1998 Radford et al. ............ 501/95.2
5,856,252 A * 1/1999 Lange et al. ................ 501/95.2
5,866,244 A * 2/1999 Jessen et al. ............... 501/95.2

OTHER PUBLICATIONS

R. Singh et al.; Effect of Boron Nitride Coating on Fiber–Matrix Interactions; Advanced Ceramic Materials, vol. 3, No. 3; 1988; pp. 235–237, No month.
R. Lowden et al.; Interface Modification in Nicalon SiC Composites; Ceram. Eng. Sci.Proc. 9 [7–8] 1988; pp. 705–720, No month.
S. Sambasivan; Interfacial Coatings for Ceramic–Matrix Composites vol. II, Final Report Jun. 9, 1998; DE–AC21–95MC32085–99; pp. 1–19.
M.Lu; evaluation of Interfacial Properties in Cermic Coating/Fiber Composites; Ceram.Eng.Sci. Proc. 11[9–10] 1990; pp. 1761–1777.

* cited by examiner

Primary Examiner—Karl Group
(74) Attorney, Agent, or Firm—Norris McLaughlin & Marcus

(57) ABSTRACT

The present invention discloses an oxide ceramic fiber/oxide ceramic composite material comprising primary composite materials each consisting of (a) an assembly of ceramic fibers composed mainly of a metal oxide and (b) a metal oxide ceramic which includes the ceramic fiber assembly (a) therein, the metal oxide of the ceramic (b) being different from the main component metal oxide of the ceramic fiber assembly (a) and the amount of the metal oxide ceramic (b) being 1 to 85% by weight relative to the weight of the ceramic fiber assembly (a), and a metal oxide ceramic which is a matrix for the primary composite materials and which includes the primary composite materials therein, the metal oxide of the ceramic being the same as or different from the main component metal oxide of the ceramic fiber assembly (a); and a process for producing thereof.

10 Claims, 2 Drawing Sheets

PRIOR ART

OXIDE CERAMIC FIBER/OXIDE CERAMIC COMPOSITE MATERIAL AND PROCESS FOR PRODUCTION THEREOF

BACKGROUND OF THE INVENTION

1. Field of the Invention

The present invention relates to an oxide ceramic fiber/oxide ceramic composite material which is an oxide ceramic reinforced with an oxide ceramic fiber and which has high toughness and is machinable; as well as to a process for producing such a composite material.

2. Description of the Prior Art

Oxide ceramics have been employed, for their oxidation resistance, as a heat-shielding sheet for high temperatures or as a spacer used in a heat treatment of metal or the like in high-temperature oxidizing atmosphere.

Monolithic oxide ceramics easily give cracking or warpage when subjected to thermal shock and are therefore unusable in the above applications for a long period of time. Moreover, these ceramics are inferior in mechanical impact resistance and, when subjected to mechanical impact, give much chipping and cracking; therefore, they need elaborate handling. For example, alumina ceramics are generally known to be inferior in thermal shock resistance and mechanical impact resistance.

In order to obtain an improved resistance to thermal shock, there are ceramic materials comprising a non-oxide ceramic of high thermal shock resistance and an oxidation-resistant film formed thereon.

Also, there are being investigated materials comprising a carbon material of low oxidation resistance and an oxidation-resistant ceramic layer formed thereon.

The above non-oxide ceramic or carbon material having an oxidation-resistant film or layer formed thereon, however, has defects (e.g. cracks) in the surface film or layer, in some cases. Further, in the surface film or layer, cracks tend to generate owing to the thermal expansion difference between the base material and the surface film or layer. The presence of such defects and cracks accelerates the oxidation of the inner base material, posing a limit to an increase in the life of the base material. Thus, the technique of covering the surface of a base material with a film or a ceramic layer is low in reliability with respect to oxidation resistance.

Meanwhile, there are composite materials of various kinds, obtained by reinforcing an oxide ceramic with ceramic particles or whiskers.

These composite materials obtained by reinforcing an oxide ceramic with ceramic particles or whiskers have shown some improvements in toughness to impact fracture. However, they are not improved in fragility which is the biggest weakness of ceramic materials, and still have a drawback that once they start fracture, it leads to total fracture owing to the fragility.

There have also been developed composite materials obtained by reinforcing an oxide ceramic with an oxide fiber.

These composite materials, unlike the monolithic oxide ceramics, are confirmed to have a large fracture resistance. When in producing such a composite material, the oxide ceramic and the oxide fiber react with each other during sintering, the resulting composite material is very low in strength. In order to avoid such a reaction, a reaction-preventive coating material has been applied to each oxide fiber. Incidentally, the coating material is applied to each fiber uniformly in a thickness of several microns or less {e.g. Advanced Ceramic Materials, Vol. 3, [3], 235–237 (1990); Ceram. Eng. Sci. Proc., 11 [9–10], 1761–1777 (1990)}.

FIG. 2 is a schematic view showing the section of a conventional oxide ceramic fiber/oxide ceramic composite material.

As shown in FIG. 2, in a conventional oxide ceramic fiber/oxide ceramic composite material 200, ceramic fibers 20 are dispersed in an oxide ceramic matrix 22. The surface of each ceramic fiber 20 is covered uniformly with a coating material 24 of several microns or less in thickness. The coating material 24 separates each ceramic fiber 20 from the matrix 22 and prevents their reaction.

In some of the composite materials obtained by reinforcing an oxide ceramic with an oxide fiber, the oxide fiber is coated with a porous oxide (e.g. $Al_2O_3$ or $ZrO_2$), BN or carbon {Ceram. Eng. Sci. Proc., 9 [7–8] 705–720 (1988)}, or with monazite under controlled conditions (U.S. DOE Reports DOE-MC-32085-99-Vol. 2).

When an oxide ceramic is reinforced with an oxide fiber bundle consisting of large number of fibers, however, it is difficult to coat the surface of each fiber of the fiber bundle uniformly with the coating material 24. Moreover, since the coating material 24 peels off easily, the fibers after coating must be handled elaborately.

If in producing the above composite material, part of the coating material 24 is detached from each fiber 20, and each fiber 20 and the matrix ceramic 22 come into direct contact, the composite material is deteriorated in strength at the site of direct contact. As a result, the merit of using the fibers for obtaining a composite material is reduced.

Further, elaborate handling of the fibers, prevention of the coating material from peeling, and realization of optimum interfacial state require a very complicated operation, leading to an increase in production cost.

Furthermore, in selecting the raw materials for use in production of composite material, it is necessary to consider the fiber, the coating material and the oxide from the overall standpoints of their chemical and physical properties and judge the mutual compatibility of the raw materials. Therefore, the selection range of the raw materials is restricted and the selection of the raw materials most suitable for an intended composite material is restricted.

SUMMARY OF THE INVENTION

The present inventors made a study in order to solve the above-mentioned problems. As a result, the present inventors found out that the above problems could be solved by, in producing an oxide ceramic fiber/oxide ceramic composite material, first producing a primary composite material and then producing a secondary composite material using the primary composite material. This finding has led to the completion of the present invention.

Objects of the present invention are to provide an oxide ceramic fiber/oxide ceramic composite material which is superior in high-temperature oxidation resistance and thermal shock resistance, which is free from fragility (this is a weak point of oxide ceramics) and which is easy to produce; and a process for producing such a composite material.

The above objects are achieved by the present invention which follows.

1. An oxide ceramic fiber/oxide ceramic composite material comprising:
   primary composite materials each consisting of (a) an assembly of ceramic fibers composed mainly of a metal oxide and (b) a metal oxide ceramic which includes the ceramic fiber assembly (a) therein, the metal oxide of the ceramic (b) being different from the main component metal oxide of the ceramic fiber assembly (a) and the amount of the metal oxide ceramic (b) being 1 to 85% by weight relative to the weight of the ceramic fiber assembly (a), and a metal oxide ceramic which is a matrix for the primary composite materials and which includes the primary composite materials therein, the metal oxide of the ceramic being the same as or different from the main component metal oxide of the ceramic fiber assembly (a), which composite material is integrally sintered and has a relative density of 20 to 95% as compared with the density of the total metal oxides in the composite material.

2. A composite material according to the above 1, wherein the main component metal oxide of the ceramic fiber assembly (a) is at least one kind of metal oxide selected from alumina, silica, alumina-silica, mullite, titania, YAG and zirconia.

3. A composite material according to the above 1, wherein the metal element of the metal oxide ceramic (b) including the ceramic fiber assembly (a) therein is an element selected from group IV (titanium group), group V (vanadium group) and group VI (chromium group) of the periodic table.

4. A composite material according to the above 1, wherein in any section of the composite material, the fiber axes of different ceramic fiber assemblies are aligned in various directions and the angles formed by the fiber axes are 30° or more.

5. A composite material according to the above 1, wherein each ceramic fiber of the ceramic fiber assembly (a) is a ceramic fiber containing 25% by weight or more of $Al_2O_3$ and the ceramic fibers are contained in the composite material in an amount of 5% by volume or more.

6. A composite material according to the above 1, wherein the ceramic fiber assembly (a) is a fabric wherein the axes of the fibers are aligned in one direction.

7. A composite material according to the above 1, wherein the ceramic fiber assembly (a) is a fabric wherein the axes of the fibers are aligned two-dimensionally.

8. A composite material according to the above 1, wherein the ceramic fiber assembly (a) is a fabric wherein the axes of the fibers are aligned multi-dimensionally.

9. A composite material according to the above 1, wherein the metal oxide of the ceramic (b) different from the main component metal oxide of the ceramic fiber assembly (a) consists of two kinds or more of metal oxides different in chemical composition.

10. A composite structure which is a sintered material between a ceramic structure and an oxide ceramic fiber/oxide ceramic composite material set forth in the above 1.

11. A process for producing an oxide ceramic fiber/oxide ceramic composite material having a relative density of 20 to 95% by weight as compared with the density of the total metal oxides in the composite material, which process comprises:

allowing a metal or metal oxide to include therein an assembly of ceramic fibers composed mainly of a metal oxide to obtain a primary composite material, the metal or metal oxide being different from the main component metal oxide of the ceramic fiber assembly and being used in an amount of 1 to 85% by weight as compared with the weight of the ceramic fiber assembly, allowing a metal oxide which is the same as or different from the main component metal oxide of the ceramic fiber assembly, to include therein the primary composite material to obtain a secondary composite material, and firing the secondary composite material in an oxidizing atmosphere to obtain an integral sintered material.

12. A process for producing a composite material according to the above 11, wherein the main component metal oxide of the ceramic fiber assembly is at least one kind of metal oxide selected from alumina, silica, alumina-silica, mullite, titania, YAG and zirconia.

13. A process for producing a composite material according to the above 11, wherein the metal element of the metal or metal oxide including therein the ceramic fiber assembly is an element selected from group IV (titanium group), group V (vanadium group) and group VI (chromium group) of the periodic table.

14. A process for producing a composite material according to the above 11, wherein each ceramic fiber of the ceramic fiber assembly is a ceramic fiber containing 25% by weight or more of $Al_2O_3$ and the ceramic fibers are contained in the composite material in an amount of 5% by volume or more.

15. A process for producing a composite material according to the above 11, wherein the metal oxide different from the main component metal oxide of the ceramic fiber assembly consists of two kinds or more of metal oxides different in chemical composition and the firing in oxidizing atmosphere to obtain an integral sintered material is conducted at temperatures of 1,000° C. or more for 30 minutes or more.

The composite material of the present invention has high thermal shock resistance. Further, the present composite material has a feature that even when a small mar generates therein, the mar does not lead to the total fracture of the composite material. Therefore, the present composite material can be subjected to cutting, drilling, etc. The present composite material is flexible when it is a thin material. The present composite material can also be produced in a large size.

The composite material of the present invention has a relative density of 20 to 95% and has voids inside. These voids suppresses the spreading of the cracks generating in the composite material during the thermal expansion or shrinkage, and function like a buffer material. Further, the present composite material is superior in thermal shock resistance in high-temperature oxidizing atmosphere.

The composite material of the present invention has flexibility because no complete bonding is formed between the matrix and the individual fibers. As a result, even when the composite material undergoes a mechanical impact, the composite material is hardly fractured, and it is suited for applications such as electrical insulating material having a curved surface.

Therefore, the composite material of the present invention is suited for insulating materials for semiconductor diffusion furnace, CVD apparatus, high-temperature electric furnace, etc.; heat-resistant spacers used in heat treatment of metals, etc.; high-temperature gas filters; molten metal filters; filter burners; burners; gas turbine engine members such as ceramic burner diffuser and the like; and so forth.

In producing the composite material of the present invention, an oxide hardly reactive with ceramic fibers is allowed to include ceramic fibers therein, to produce a primary composite material, after which a metal oxide is allowed to include the primary composite material therein, to produce a secondary composite material. Thus, unlike in production of conventional composite materials, it is not necessary to coat individual ceramic fibers with the oxide hardly reactive with ceramic fibers, in order to prevent a reaction between the ceramic fibers and the metal oxide. As a result, the present composite material can be produced simply.

BRIEF DESCRIPTION OF THE DRAWINGS

In FIGS. 1–3, numeral 2 refers to a ceramic fiber; numeral 4 refers to a primary metal oxide ceramic; numeral 6 refers to a primary composite material; numeral 8 refers to a matrix; numeral 20 refers to a ceramic fiber; numeral 22 refers to a matrix; and numeral 24 refers to a coating material.

DETAILED DESCRIPTION OF THE PREFERRED EMBODIMENT

Figure 1:
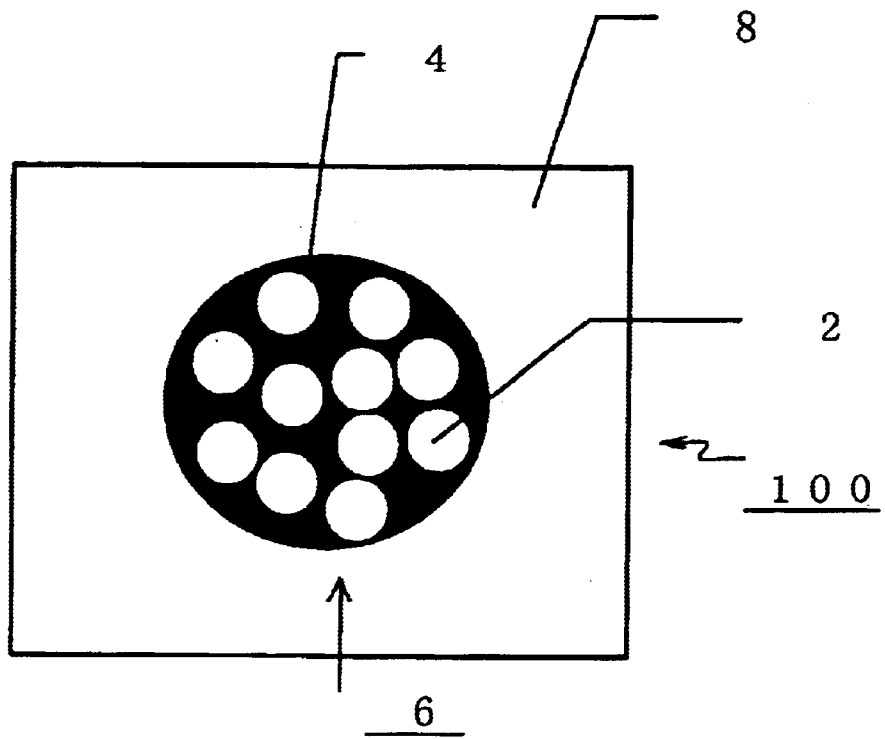
FIG. 1 is a schematic sectional view of an oxide ceramic fiber/oxide ceramic composite material of the present invention.
Figure 2:
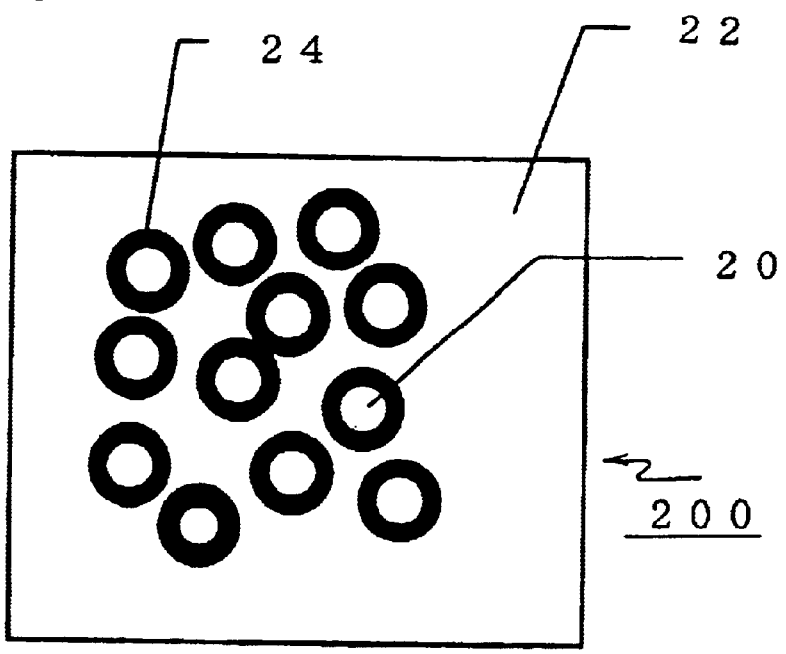
FIG. 2 is a schematic sectional view of a conventional oxide ceramic fiber/oxide ceramic composite material.

Description is made on the oxide ceramic fiber/oxide ceramic composite material of the present invention, with reference to FIG. 1.

FIG. 1 is a schematic sectional view of an oxide ceramic fiber/oxide ceramic composite material of the present invention.

An oxide ceramic fiber/oxide ceramic composite material 100 of the present invention comprises a large fluster of primary composite materials 6 (only one primary composite material is shown in FIG. 1) and a matrix 8 (a metal oxide ceramic) which includes the primary composite materials 6 therein. Each primary composite material 6 consists of (a) an assembly of a large number of ceramic fibers 2 (11 ceramic fibers are shown in FIG. 1) composed mainly of a metal oxide and (b) a primary metal oxide ceramic 4 (this metal oxide is different from the main component metal oxide of the ceramic fiber assembly) which covers the ceramic fiber assembly and also is infiltrated into the gaps between the ceramic fibers 2. The metal oxide ceramic of the matrix 8 is the same as or different from the main component metal oxide of the ceramic 30 fiber assembly.

The content of the primary metal oxide ceramic 4 in the primary composite 6 is preferably 1 to 85% by weight, more preferably 3 to 40% by weight relative to the weight of the ceramic fibers 2.

Figure 3:
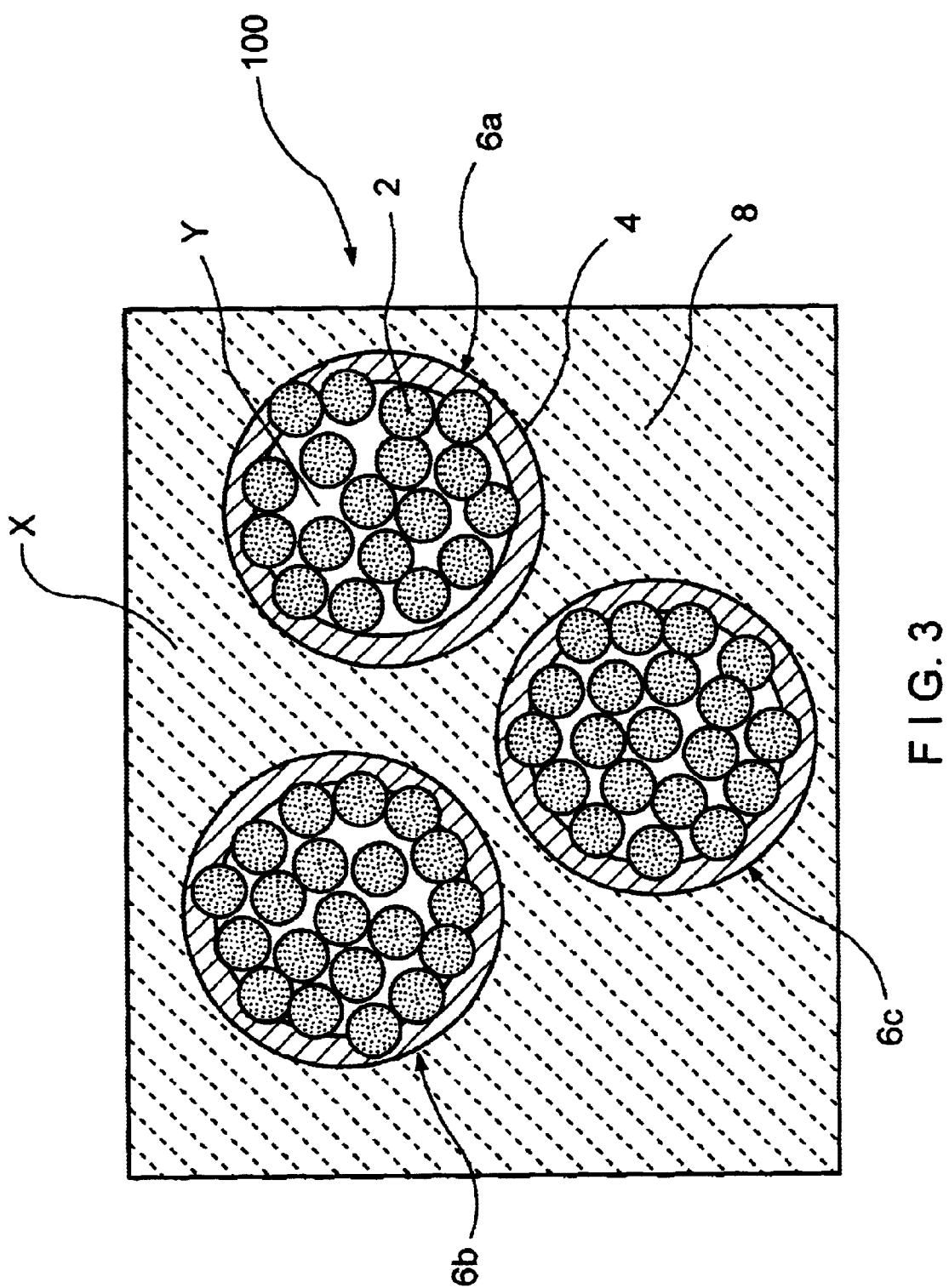
FIG. 3 is a schematic sectional View of an oxide ceramic fiber/oxide ceramic composite material of the present invention, showing a plurality of primary composite materials.

With reference also to FIG. 3, the primary metal oxide ceramic 4 completely Covers the surfaces of the ceramic fibers 2 but does not completely fill the gaps Y between the fibers 2. That is, there are voids Y see FIG. 3) between the fibers 2.

The matrix 8 fills the gaps X between the primary composite materials 6a, 6b, 6c, but is not infiltrated into the primary composite materials 6a, 6b, 6c. Therefore, even if the primary metal oxide ceramic 4 is peeled off from the surfaces of the ceramic fibers 2 during production of the present composite material, a probability is low that the ceramic fibers 2 and the matrix 8 come into direct contact to give rise to a reaction. Consequently, the ceramic fibers 2 can maintain the properties of the individual fibers before use in composite material and the resulting composite material can have greatly improved dynamic properties, etc.

The composite material of the present invention is constituted as above and is integrally sintered.

The present composite material has voids between the ceramic fibers 2 as mentioned above. Owing to the presence of these voids, the present composite material has a relative density (bulk density/true density) of 20 to 95%, preferably 40 to 65% as compared with the density of the total metal oxides in the composite material.

The composite material of the present invention can be produced, for example, as follows.

As the ceramic fiber used, there can be mentioned, for example, an alumina fiber, a silica fiber, an alumina-silica fiber, a mullite fiber, a titania fiber, a YAG fiber and a zirconia fiber. The diameter of the fiber is preferably 0.3 to 325 $\mu$m, more preferably 5 to 20 $\mu$m.

In the present invention, ceramic fibers are bundled to form a ceramic fiber assembly. The ceramic fiber assembly may be a fiber bundle made from long fibers using a known binder or a sizing agent. The ceramic fiber assembly may also be a bundle of spun yarns of long ceramic fibers or short ceramic fibers. The ceramic fiber assembly may also be a tape, a sleeve, a unidirectional sheet, a cloth or the like all made from yarns, fiber bundles, long fibers or the like. The fiber bundles, yarns, etc. are preferably used by being wound round a bobbin, for easy handling.

Next, the ceramic fiber assembly is impregnated with a metal (hereinafter referred to as primary addition metal) which is different from the metal of the main component metal oxide of the ceramic fiber assembly, or with a metal oxide (hereinafter referred to as primary addition metal oxide) which is different from the main component metal oxide of the ceramic fiber assembly, whereby is obtained a primary composite material 6 comprising a metal or a metal oxide and a ceramic fiber assembly. That is, the primary addition metal or the primary addition metal oxide is allowed to infiltrate into the gaps between ceramic fibers of the fiber assembly and also coat the surface of the ceramic fiber assembly.

The primary addition metal or the primary addition metal oxide is used for impregnation of the ceramic fiber assembly, preferably in the form of a colloidal solution, a sol solution or a slurry.

The primary addition metal or the primary addition metal oxide is preferably at least one kind of metal selected from the group IV (titanium group), group V (vanadium group) and group VI (chromium group) of the periodic table, or an oxide thereof (the metal and the oxide react hardly with the ceramic fiber assembly during the firing described later).

Specific examples of the primary addition metal are molybdenum, titanium, chromium and tungsten; and specific examples of the primary addition metal oxide are zirconia, vanadium oxide, chromia and titania.

The amount of the primary addition metal or the primary addition metal oxide used for impregnation are 1 to 85% by weight, preferably 3 to 40% by weight relative to the weight of the ceramic fiber assembly.

The primary composite material produced as above is as necessary dried at room temperature or at room temperature to 200° C.

Then, the primary composite material is allowed to be included by at least one kind of metal oxide (hereinafter referred to as secondary addition metal oxide) which is the same as or different from the main component metal oxide of the ceramic fiber assembly, whereby is obtained a secondary composite material.

The inclusion is conducted, for example, by coating a powder of the secondary addition metal oxide or a slurry of the powder on a plurality of the primary composite materials and then laminating the coated primary composite materials.

The secondary composite material is then fired in oxidizing atmosphere to obtain a composite material of the present invention which is integrally sintered and which has a relative density of 20 to 95%.

The firing of the secondary composite material to obtain an integrally sintered material is conducted at a maximum temperature of 1,000° C. or more, preferably 1,000 to 1,300° C. for 30 minutes or more, preferably 1 to 5 hours.

According to the production process of the present invention, an oxide ceramic fiber/oxide ceramic composite material can be produced in various shapes.

For example, when the primary composite material is a fiber bundle-like material wound round a bobbin, the primary composite material is wound off from the bobbin and is passed through a slurry of a secondary addition metal oxide (this becomes a matrix) to obtain a fiber bundle-like secondary composite material. Then, this secondary composite material is wound in a desired shape by a filament-winding method, dried and fired, whereby a composite material of intended shape can be produced.

A platy composite material can be produced, for example, by producing primary composite materials from a ceramic fiber cloth and a primary addition metal or a primary addition metal oxide, laminating the primary composite materials, impregnating the resulting laminate with a secondary addition metal oxide to produce a secondary composite material, and firing the secondary composite material.

A cylindrical composite material can be produced, for example, by impregnating a ceramic fiber cloth formed in a cylindrical shape, with a slurry of a primary addition metal oxide, drying the impregnated ceramic fiber cloth to produce a primary composite material, impregnating the primary composite material with a slurry of a secondary addition metal oxide, i.e. a slurry of a matrix to produce a secondary composite material, and firing the secondary composite material.

It is also possible to attach a secondary composite material produced from a ceramic fabric, to a ceramic structure produced separately and then subjecting them to sintering to produce an integral composite structure. The integral composite structure, even when it is subjected to thermal shock and cracks generate in the ceramic structure, maintains its dynamic strength owing to the integral composite nature.

In the composite material of the present invention, the fiber axis direction of the ceramic fiber assembly can be unidirectional, bidirectional or multidirectional.

Particularly when, in any section of the present composite material, individual ceramic fiber assemblies have two or more fiber axes of different directions and the angles formed by the different fiber axes are 30° or more, such a composite material has excellent strengths in all directions.

In a preferred composite material of the present invention, the ceramic fiber contains $Al_2O_3$ in an amount of 25% by weight or more, preferably 60 to 100% by weight, and the ceramic fiber content in the composite material is 5% by volume or more, preferably 10 to 50% by volume.

The present invention is described specifically below by way of Examples. However, the present invention is in no way restricted by the Examples.

EXAMPLE 1

A yarn consisting of 1,000 alumina long continuous fiber filaments of 10 μm in diameter was continuously passed through a colloidal $ZrO_2$ slurry [$ZrO_2$ concentration: 30% by weight, average particle diameter: 70 nm, Zirconia Sol (trade name), a product of Nissan Chemical Industries, Ltd.] to impregnate the yarn with the slurry. The impregnated yarn was dried at 105° C. to produce an alumina long fiber yarn/$ZrO_2$ composite material as a primary composite material.

In the alumina long fiber yarn/$ZrO_2$ composite material, the amount of $ZrO_2$ was 5% by weight relative to the weight of the alumina long fiber yarn.

The alumina long fiber yarn/$ZrO_2$ composite material was immersed in an aqueous slurry containing 70% by weight of an $Al_2O_3$ powder of 0.2 μm in average particle diameter and 0.5% by weight of a polyvinyl alcohol. Then, the resulting composite material was aligned so that the fiber axis became unidirectional, whereby was produced a sheet-like preform (a unidirectional sheet). On this unidirectional sheet was coated a small amount of the above alumina slurry such coated unidirectional sheets were laminated in six layers so that the directions of the fiber axes of the individual sheets became 0°, 45° and 90° in this order.

On the resulting laminate was applied a pressure to produce a laminated sheet. The laminated sheet was dried at 105° C. and then fired at 1,200° C. for 1 hour in the atmosphere to obtain an oxide ceramic fiber/oxide ceramic composite material (a plate-like composite material) of the present invention.

The plate-like composite material had a thickness of 1.8 mm, a relative density of 76% as compared with the density of the total metal oxides in the composite material and a bending strength of 60 MPa. The plate-like composite material had a bending strength of about ⅕ as compared with that of a monolithic alumina ceramic. However, the plate-like composite material had flexibility and, when bent, did not fracture at a stretch and showed a very large flex before the fracture. The plate-like composite material was subjected to a nailing test; as a result, a nail could be easily driven into the composite material without destructing it.

COMPARATIVE EXAMPLE 1

A plate-like composite material was obtained in the same manner as in Example 1 except that the alumina long fiber yarn was not passed through the colloidal $ZrO_2$ slurry.

The plate-like composite material had a thickness of 1.5 mm, a relative density of 78% and a bending strength of 62 MPa. The bending strength of the plate-like composite material of Comparative Example 1 was about the same as that of the plate-like composite material of Example 1. However, the plate-like composite material of Comparative Example 1 was inferior in flexibility and fractured at a stretch. This is considered to be because the fiber and the matrix alumina caused fiber-matrix bonding during firing.

EXAMPLE 2

A tape of 150 μm in thickness and 50 mm in width was produced by weaving, using an $Al_2O_3$-$SiO_2$ [Al:Si=70:30 (weight ratio)] fiber of 7 μm in diameter. This tape was continuously passed through a 2:1 (weight ratio) mixed slurry of a colloidal $ZrO_2$ slurry ($ZrO_2$ concentration: 30% by weight, average particle diameter: 70 nm) and a colloidal $Al_2O_3$ slurry [$Al_2O_3$ concentration: 10% by weight, average particle diameter: 100 nm ×10 nm (needle-like)], and then dried at 105° C. to produce a tape-like primary composite material. The total amount of colloidal $ZrO_2$ and colloidal $Al_2O_3$ in the tape-like primary composite material was 15% of the weight of the tape.

The tape-like primary composite material was immersed in an aqueous slurry containing 70% by weight of an $Al_2O_3$ powder of 0.2 μm in average particle size, and then dried to produce a tape-like preform material.

The tape-like preform material was dried at 105° C. and then fired at 1,150° C. for 1 hour in the atmosphere to obtain a tape-like composite material. It had a relative density of 76%.

The tape-like composite material had a thickness of 0.2 mm. The composite material was wound round a pipe and subjected to a flexibility test. As a result, the composite material could be wound round a pipe of 10 mm in diameter without fracture and was found to be superior in flexibility.

COMPARATIVE EXAMPLE 2

A tape-like composite material was obtained in the same manner as in Example 2 except that the tape produced by weaving was not passed through the mixed slurry of a colloidal $ZrO_2$ slurry and a colloidal $Al_2O_3$ slurry.

The tape-like composite material had a thickness of 0.2 mm. The composite material was wound round a pipe and subjected to a flexibility test. As a result, the composite material gave cracks when wound round a pipe of 30 mm in diameter and was found to be inferior in flexibility.

EXAMPLE 3

A plain weave fiber cloth was produced using a yarn obtained by bundling 500 $Al_2O_3$ fibers of 10 μm in diameter. The fiber cloth was heat-treated at 800° C. to remove the sizing agent contained therein.

The resulting fiber cloth was immersed in a mixed aqueous slurry obtained by mixing three slurries, i.e. a metallic molybdenum powder slurry [Molybdenum Powder TMO-10 (trade name), a product of Allied Material Corp.], a zirconia nanopowder slurry [Zirconia Sol (trade name), a product of Nissan Chemical Industries, Ltd.] and a colloidal alumina slurry [Nanowhisker (trade name), a product of Satoh Research, $Al_2O3$ concentration: 10% by weight] and then adding thereto 0.3% by weight of a polyvinyl alcohol. The weight ratio of Mo, $ZrO_2$ and $Al_2O_3$ in the mixed aqueous slurry was 5:50:45.

The fiber cloth after immersion in the mixed aqueous slurry was dried at 105° C. for 10 hours to produce a cloth-like primary composite material of 250 μm in thickness. The total amount of the metal and metal oxides included in the cloth was 30% by weight relative to the weight of the cloth.

On the cloth-like primary composite material was coated an aqueous slurry containing 70% by weight of a mullite powder (average particle size: 1.0 μm), 5% by weight of a polyvinyl alcohol and 5% by weight of glycerine, whereby was obtained a cloth-like secondary composite material in which the gaps between the yarns inside the primary composite material were filled with the mullite slurry.

The cloth-like secondary composite material was wound round a teflon-made cylinder of 100 mm in diameter; the slurry adhering to the secondary composite material was made uniform using a scraper and the secondary composite material was dried at 105° C.; then, the dried secondary composite material was removed from the cylinder and fired at 1,250° C. for 1.5 hours in the atmosphere.

Round the fired material (cylindrical) was wound the second composite material, followed by drying at 105° C. and firing at 1,250° C. for 1.5 hours in the atmosphere. This operation was repeated 8 times, whereby a cylindrical composite material of the present invention was obtained.

The composite material had a thickness of 2.5 mm and a relative density of 93%. The composite material was subjected to a nailing test. As a result, a nail could be driven into the composite material without causing its fracture.

EXAMPLE 4

A plain weave fiber cloth was produced using a yarn obtained by bundling 1,000 $Al_2O_3$ fibers of 10 μm in diameter. The fiber cloth was immersed in a colloidal zirconia slurry [average particle size: 70 nm, $ZrO_2$ concentration: 30% by weight, Zirconia Sol (trade name), a product of Nissan Chemical Industries, Ltd.], followed by drying, to produce a cloth-like primary composite material. The primary composite material contained colloidal zirconia in an amount of 13% by weight relative to the weight of the $Al_2O_3$ fiber.

On this cloth-like primary composite material was coated a slurry consisting of 65% by weight of an $Al_2O_3$ powder of 0.2 μm in average particle size, 5% by weight of a polyvinyl alcohol and 30% by weight of water, to produce a cloth-like secondary composite material.

The cloth-like secondary composite material was attached to the surface of a dense $Al_2O_3$ sintered plate (150 mm×150 mm×5 mm) having a bulk density of 3.90 $g/cm^3$. Then, a pressure was applied to them to allow them to tightly adhere to each other. The resulting material was dried at 105° C. to obtain a dried material. The dried material was fired at 1,300° C. for 2 hours in the atmosphere to obtain a plate-like composite structure wherein a dense $Al_2O_3$ sintered plate having thereon an $Al_2O_3$ fiber composite material was sintered. The composite material had a relative density of 95%.

The plate-like composite structure was subjected to a thermal shock test by air cooling. That is, the composite structure was heated to 500° C. in a heating furnace maintained at that temperature, and the heated composite structure was taken out of the heating furnace and allowed to cool. The $Al_2O_3$ sintered plate cracked; however, the composite material adhered thereon gave no crack; and the composite structure as a whole did not collapse and retained the original shape.

What is claimed is:

1. An oxide ceramic fiber/oxide ceramic composite material comprising:

a plurality of primary composite materials having gaps therebetween, each consisting of (a) an assembly of ceramic fibers composed mainly of a first metal oxide and (b) a second metal oxide ceramic which surrounds the ceramic fiber assembly (a) therein, a second metal oxide of the second metal oxide ceramic (b) being different from the first metal oxide of the ceramic fiber assembly (a) and the amount of the second metal oxide ceramic (b) being 1 to 85% by weight relative to the weight of the ceramic fiber assembly (a), and a third metal oxide ceramic which is a matrix for the primary composite materials and which includes the primary composite materials therein, the matrix filling gaps between the primary composite materials, but not infiltrating into the ceramic fiber assembly (a), a third metal oxide of the third metal oxide ceramic being the same as or different from the first metal oxide of the ceramic fiber assembly (a), which composite material is integrally sintered and has a relative density of 20 to 95% as compared with the density of the total metal oxides in the composite material.

2. A composite material according to claim 1, wherein the first metal oxide of the ceramic fiber assembly (a) is chosen from the group consisting of alumina, silica, alumina-silica, mullite, titania, YAG, zirconia, and combinations thereof.

3. A composite material according to claim 1, wherein the metal element of the second metal oxide ceramic (b) is chosen from the group consisting of group IV (titanium group), group V (vanadium group) and group VI (chromium group) of the periodic table.

4. A composite material according to claim 1, wherein in any section of the composite material, fiber axes of two or more ceramic fiber assemblies are aligned in various directions and angles formed between two fiber axes are 30° or more.

5. A composite material according to claim 1, wherein each ceramic fiber of the ceramic fiber assembly (a) is a ceramic fiber containing 25% by weight or more of $Al_2O_3$ based on the ceramic fiber, and the ceramic fibers are present in an amount of 5% by volume or more based on the composite material.

6. A composite material according to claim 1, wherein the ceramic fiber assembly (a) is a fabric wherein axes of the fibers are aligned in one direction.

7. A composite material according to claim 1, wherein the ceramic fiber assembly (a) is a fabric wherein axes of the fibers are aligned two-dimensionally.

8. A composite material according to claim 1, wherein the ceramic fiber assembly (a) is a fabric wherein axes of the fibers are aligned multi-dimensionally.

9. A composite material according to claim 1, wherein the second metal oxide consists of at least two different metal oxides.

10. An integral, sintered composite structure comprising a ceramic Structure and composite material as set forth in claim 1.

* * * * *